(12) United States Patent
Holzinger et al.

(10) Patent No.: US 8,392,051 B2
(45) Date of Patent: Mar. 5, 2013

(54) DATA TRANSMISSION ASSEMBLY

(75) Inventors: Stefan Holzinger, Vienna (AT); Wolfgang Köllner, Vienna (AT)

(73) Assignee: Continental Automotive GmbH, Hannover (DE)

( * ) Notice: Subject to any disclaimer, the term of this patent is extended or adjusted under 35 U.S.C. 154(b) by 584 days.

(21) Appl. No.: 12/596,494

(22) PCT Filed: Apr. 7, 2008

(86) PCT No.: PCT/EP2008/054172
§ 371 (c)(1),
(2), (4) Date: Oct. 19, 2009

(87) PCT Pub. No.: WO2008/128883
PCT Pub. Date: Oct. 30, 2008

(65) Prior Publication Data
US 2010/0152955 A1  Jun. 17, 2010

(30) Foreign Application Priority Data

Apr. 20, 2007  (DE) .......................... 10 2007 018 830

(51) Int. Cl.
*G01M 17/00* (2006.01)
*G06F 7/00* (2006.01)
*G06F 11/30* (2006.01)

(52) U.S. Cl. ..................................... 701/29.1; 307/10.1
(58) Field of Classification Search ................ 307/10.1; 701/29.1, 49
See application file for complete search history.

(56) References Cited

U.S. PATENT DOCUMENTS

| | | | | |
|---|---|---|---|---|
| 4,694,408 A | * | 9/1987 | Zaleski | 701/36 |
| 4,748,843 A | * | 6/1988 | Schafer et al. | 73/114.61 |
| 4,757,463 A | * | 7/1988 | Ballou et al. | 701/33.6 |
| 4,862,371 A | * | 8/1989 | Maekawa | 701/114 |
| 5,003,477 A | * | 3/1991 | Abe et al. | 701/33.3 |
| RE33,692 E | * | 9/1991 | Hirano et al. | 324/537 |
| 5,170,125 A | * | 12/1992 | Bates, Jr. | 324/537 |
| 5,327,343 A | * | 7/1994 | Forchert et al. | 701/1 |
| 5,345,384 A | * | 9/1994 | Przybyla et al. | 701/29.1 |
| 5,506,772 A | * | 4/1996 | Kubozono et al. | 701/29.3 |
| 6,061,393 A | | 5/2000 | Tsui et al. | |
| 6,104,988 A | * | 8/2000 | Klarer | 702/183 |

(Continued)

FOREIGN PATENT DOCUMENTS

| | | |
|---|---|---|
| DE | 3727549 A1 | 2/1988 |
| DE | 19723831 A1 | 12/1998 |

(Continued)

OTHER PUBLICATIONS

German Office Action, German Patent Application No. 10 2007 018 830.9, 2 pages, Feb. 15, 2012.

(Continued)

*Primary Examiner* — Paul N. Dickson
*Assistant Examiner* — Laura Freedman
(74) *Attorney, Agent, or Firm* — King & Spalding L.L.P.

(57) ABSTRACT

To transmit data between an electric control unit (3) that has at least one operator element connection (6; 6.1, 6.2) and a diagnostic unit (7), the diagnostic unit (7) is designed to be connected to the operator element connection (6; 6.1, 6.2) and the control unit (3) is designed to switch over (17) from an operating signal receiving status into a data transmission mode in order to deliver data via the operator element connection.

17 Claims, 5 Drawing Sheets

U.S. PATENT DOCUMENTS

| | | | |
|---|---|---|---|
| 6,216,060 B1 * | 4/2001 | Kishimoto | 701/1 |
| 6,226,574 B1 * | 5/2001 | Hiramatsu | 701/32.8 |
| 6,237,400 B1 * | 5/2001 | Takakura et al. | 73/114.61 |
| 6,266,710 B1 * | 7/2001 | Dittmer et al. | 710/1 |
| 6,438,470 B1 * | 8/2002 | Hiramatsu | 701/29.1 |
| 6,604,038 B1 * | 8/2003 | Lesesky et al. | 701/49 |
| 6,622,070 B1 | 9/2003 | Wacker et al. | |
| 7,046,126 B2 * | 5/2006 | Flick | 340/426.36 |
| 7,188,010 B2 * | 3/2007 | Kirschner | 701/29.1 |
| 7,206,672 B2 * | 4/2007 | Mueller | 701/1 |
| 7,225,065 B1 * | 5/2007 | Hunt et al. | 701/33.2 |
| 7,304,401 B2 * | 12/2007 | Enders et al. | 307/9.1 |
| 2005/0240837 A1 | 10/2005 | Dubois et al. | 714/712 |

FOREIGN PATENT DOCUMENTS

| | | |
|---|---|---|
| DE | 19748934 A1 | 5/1999 |
| DE | 10306102 A1 | 9/2004 |
| DE | 10 2004 020 564 A1 | 11/2005 |
| EP | 1591902 A2 | 11/2005 |

OTHER PUBLICATIONS

International PCT Search Report, PCT/EP2008/054175, 10 pages, Mailed Oct. 6, 2008.

German Office Action, German application No. 10 2007 018 830.9-35, 7 pages, Sep. 6, 2007.

\* cited by examiner

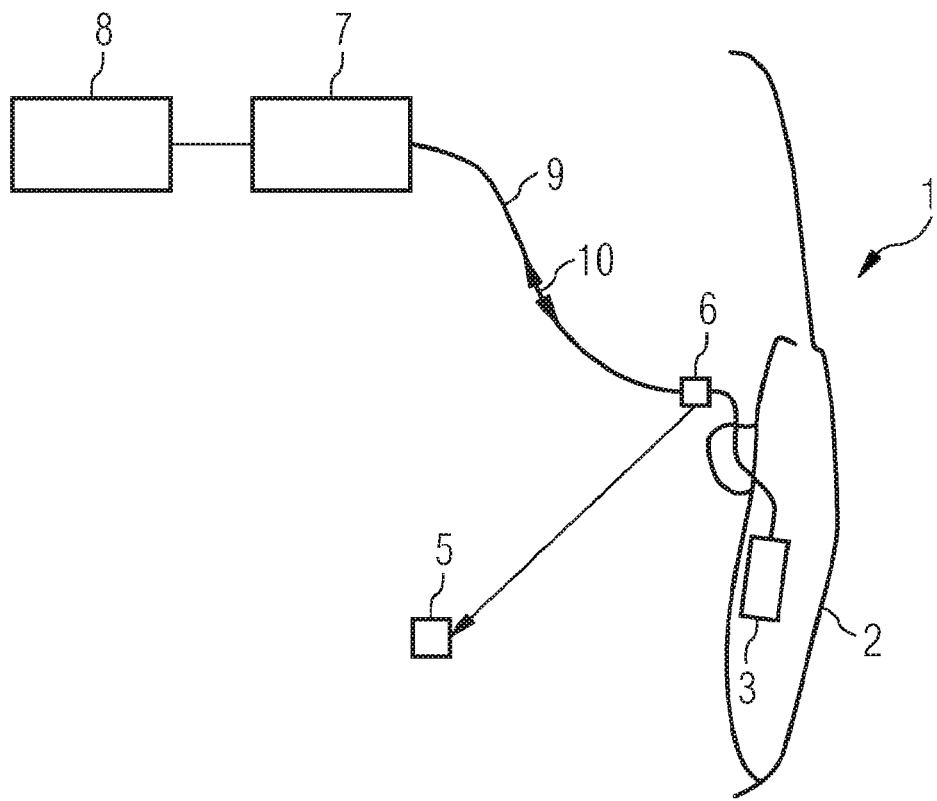
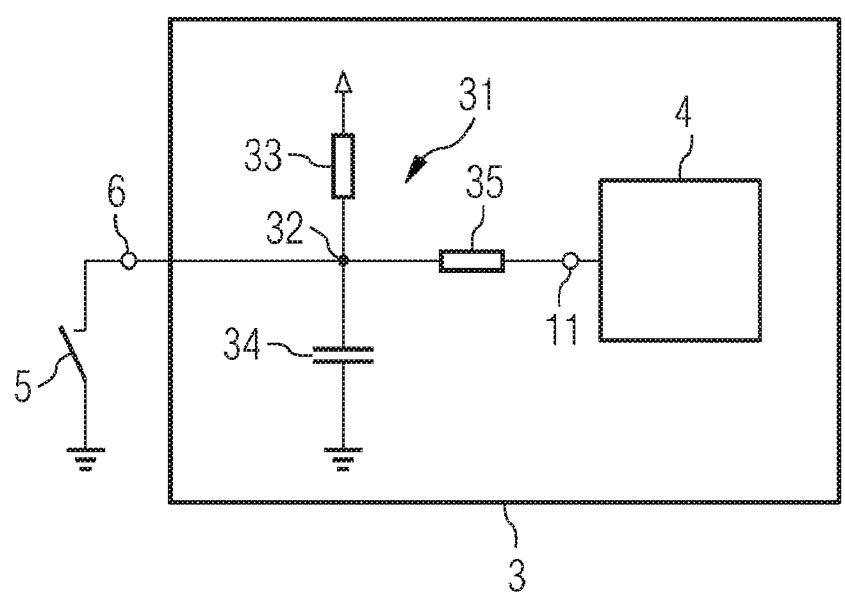

DATA TRANSMISSION ASSEMBLY

CROSS-REFERENCE TO RELATED APPLICATIONS

This application is a U.S. National Stage application of International Application No. PCT/EP2008/054172 filed Apr. 7, 2008, which designates the United States of America, and claims priority to German Application No. 10 2007 018 830.9 filed Apr. 20, 2007, the contents of which are hereby incorporated by reference in their entirety.

TECHNICAL FIELD

The invention relates to an arrangement for transmitting data between an electric control device having at least one operator control element termination and a diagnostic device.

BACKGROUND

The invention further relates to a control device for such an arrangement for the purpose of transmitting data to an external diagnostic device.

Control devices, in particular comprising microprocessors (μP) or microcontrollers (μC), are commonly used in technology, such as in particular in motor vehicles, e.g. for drive control in power window lifters or in sliding/tilting sunroofs. In such applications it is often desired to transfer data from the control device, such as the contents of variables of the controller, in real time to a test computer for diagnostic purposes. In the case of an anti-trap protection algorithm for power window lifters or sunroof drives, however, this algorithm is difficult to diagnose via any standard interfaces that may be present, such as LIN and CAN, since the processes or computing models are highly dynamic and the bus connection provides too small a bandwidth, which is insufficient for the necessary data transmission. A further problem is that control devices are frequently not equipped with a bus termination. It is also often disadvantageous that the control device is installed in the associated entity, e.g. a motor vehicle door, and is difficult to access, while numerous components of the entity, such as paneling parts of a motor vehicle door in the case of a power window lifter, have to be disassembled in a time-consuming and laborious manner in order to gain access to the control device.

It has in fact already been proposed to provide a separate diagnostic interface on control devices, with a processor pin being brought out directly—i.e. without filter and without protective circuitry—in order thereby to make it easily accessible. However, this special solution cannot be provided in series production, since then there is an exceptionally great risk of damage to the control device via the pin, e.g. due to ESD (electrostatic discharge).

As a result there is the persistent problem that a control device that is installed in series in an associated entity, such as in a motor vehicle, is either difficult or impossible to access and therefore is scarcely able to be diagnosed. For diagnostic purposes, e.g. in the case of power window lifter control devices, the door paneling would have to be opened, which is often not allowed by the manufacturer, and the control device would have be to replaced or modified or resoldered.

SUMMARY

According to various embodiments, a remedy can be provided in this regard and enable a data transmission between such a control device and a diagnostic device to take place in a simple manner, while in addition the bandwidth limitation of conventional bus connections is likewise to be circumvented.

According to an embodiment, an arrangement for transmitting data between an electric control device may have at least one operator control element termination and a diagnostic device, wherein the diagnostic device is configured for connecting to the operator control element termination, and the control device is configured for switching over from a control signal receiving status into a data transmitting operating state for the purpose of outputting data via the operator control element termination.

According to a further embodiment, the control device may have a communication module to enable communication with the diagnostic device. According to a further embodiment, the control device may have an operating state switchover module responding to a predefined switchover signal of the diagnostic device. According to a further embodiment, the operating state switchover module may have a detector detecting a predefined signal pattern and a switching module connected thereto. According to a further embodiment, the diagnostic device may have a signal equalization module, e.g. having Viterbi signal equalization. According to a further embodiment, the diagnostic device may have an input amplifier. According to a further embodiment, the diagnostic device may have a clock signal recovery unit. According to a further embodiment, the diagnostic device may have an operator control element corresponding to the operator control element of the control device. According to a further embodiment, the arrangement may comprise a single-channel connection between control device and diagnostic device in the form of a half- or preferably full-duplex connection. According to a further embodiment, the arrangement may comprise a two-channel connection between the control device having two operator control element terminations and the diagnostic device. According to a further embodiment, one channel can be provided for transmitting control commands from the diagnostic device to the control device and the other channel is provided for transmitting diagnostic data. According to a further embodiment, one channel can be provided for transmitting control commands from the diagnostic device to the control device as well as diagnostic data from the control device to the diagnostic device and the other channel is provided for clock signal transmission. According to a further embodiment, in the case of an available bus termination of the control device a bus connection serving for the transmission of control commands can be provided between the diagnostic device and the control device. According to a further embodiment, the control device can be assigned to a motor vehicle. According to a further embodiment, the control device can be assigned to a power window lifter. According to a further embodiment, the control device can be assigned to a sliding/tilting sunroof drive. According to a further embodiment, the control device can be assigned to a motor-driven vehicle door or sliding door. According to a further embodiment, the control device can be assigned to a motor-driven tailgate or trunk lid. According to a further embodiment, the control device may have an operator pushbutton or switch block as operator control element.

According to another embodiment, a control device for one of the arrangement as described above, may have at least one operator control element termination, comprising a communication module to enable communication with an external diagnostic device.

According to yet another embodiment, a control device for one of the arrangement as described above may have an operating state switchover module responding to a predefined switchover signal of the diagnostic device.

According to a further embodiment, the operating state switchover module may have a detector detecting a predefined signal pattern and a switching module connected thereto.

BRIEF DESCRIPTION OF THE DRAWINGS

The invention is explained in greater detail below with reference to preferred exemplary embodiments illustrated in the drawing, though it is by no means to be restricted to these.

Figure 3:
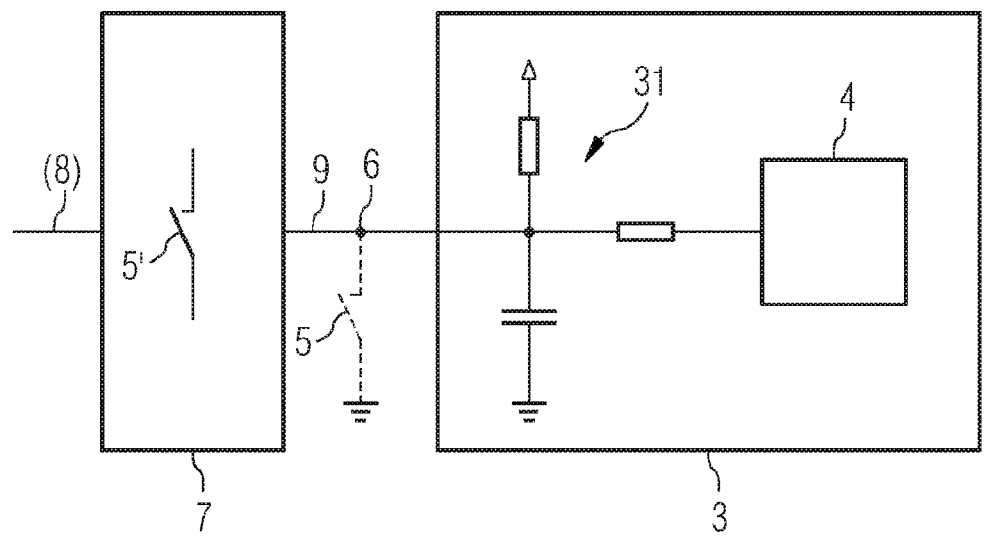
Figure 4:
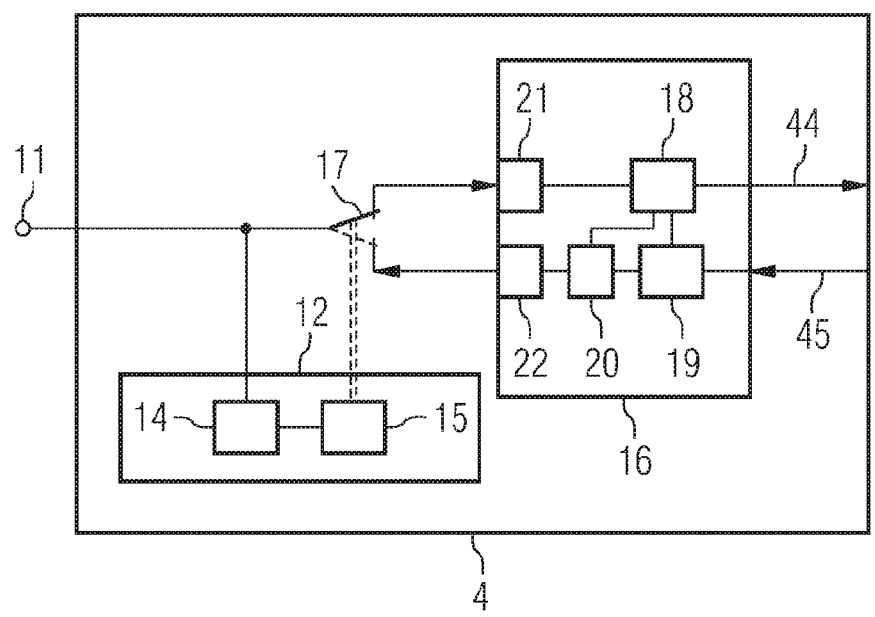
Figure 5:
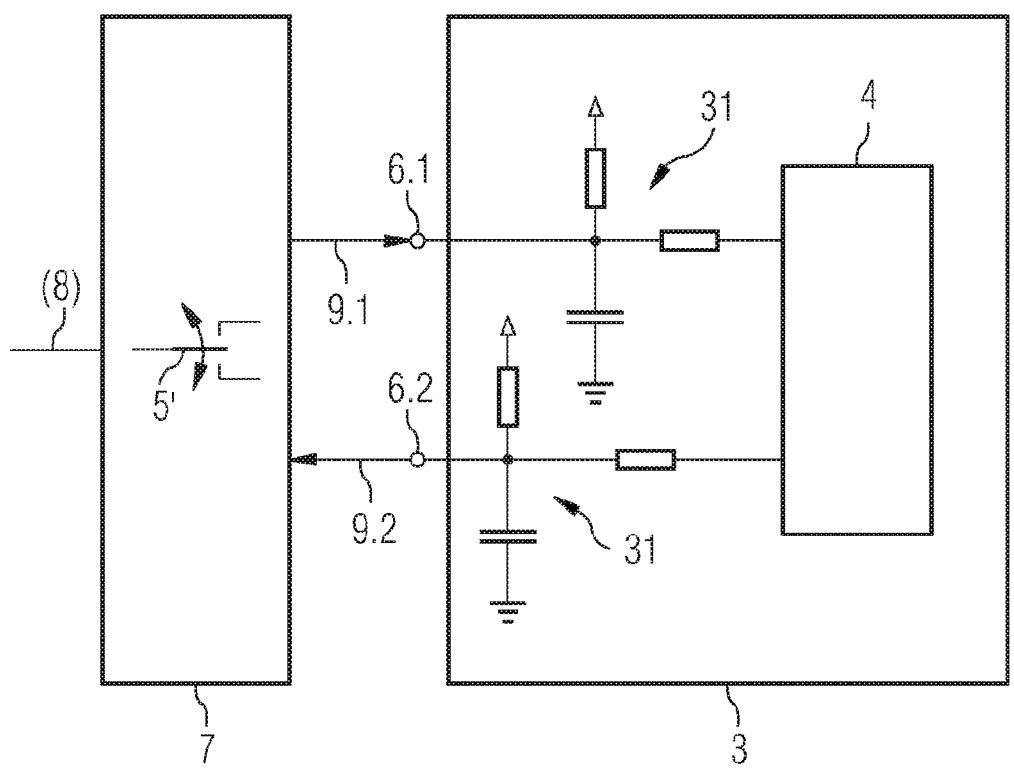
Figure 6:
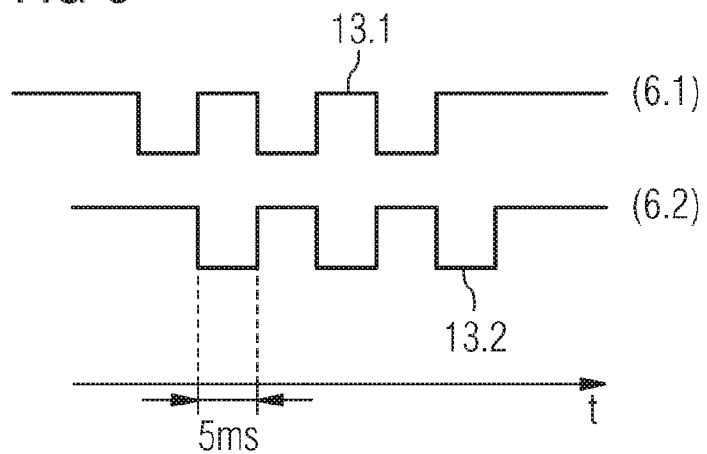
Figure 8:
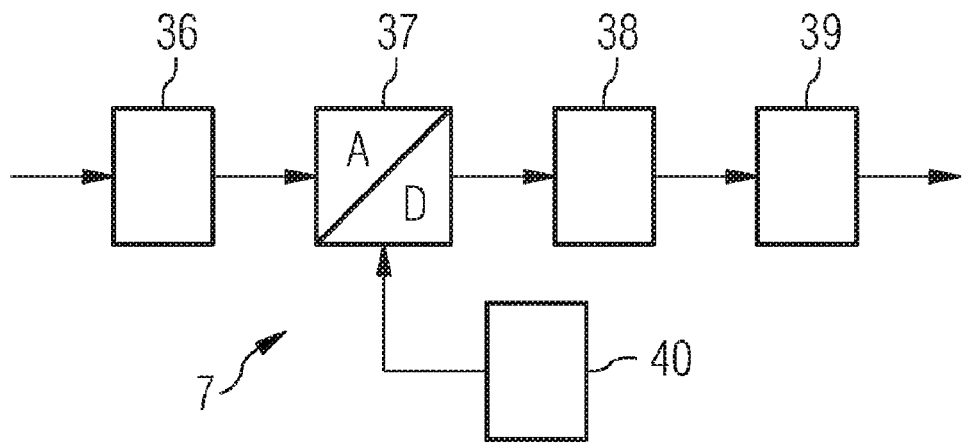
Figure 9:
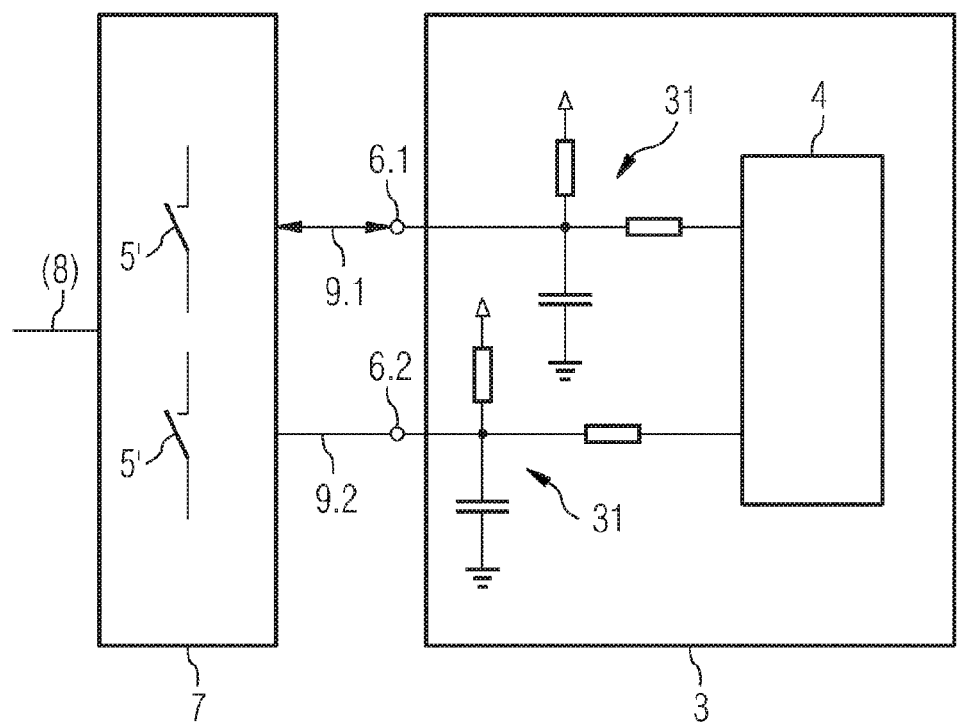
Figure 10:
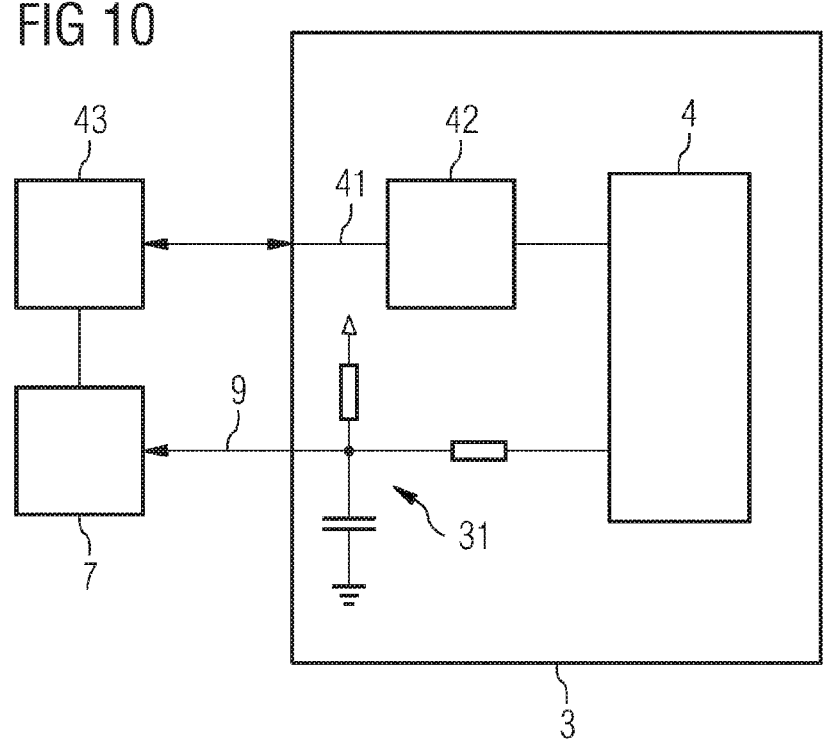

Brief description of the drawings:

FIG. 1 shows a schematic sectional view of a motor vehicle door comprising a control device for the power window lifter as well as a brought-out connector to which a test computer is connected via a diagnostic device, wherein the operator control element normally inserted onto the connector has been removed;

FIG. 2 schematically shows a typical input pin circuit of a computing unit (CPU) of such a control device;

FIG. 3 shows a control device according to FIG. 2 connected to a diagnostic device via a single-channel connection;

FIG. 4 shows in a kind of block diagram a possible modification of a computing unit (microcontroller unit) of such a control device, in particular for a power window lifter with anti-trap protection;

FIG. 5 shows in a block diagram similar to FIG. 3 an arrangement having a two-channel connection between diagnostic device and control device;

FIG. 6 shows an example of a "wakeup" signal as a predetermined signal pattern for switching over the control device into a corresponding operating state for a transmission of diagnostic data;

FIG. 7 shows in the subfigures 7A, 7B and 7C an example of a data protocol during the transmission of diagnostic data;

FIG. 8 schematically shows in a block diagram a possible layout for a diagnostic device; and FIGS. 9 and 10 show in schematic block diagrams similar to that of FIG. 5 two further exemplary embodiments of arrangements for transmitting control commands and diagnostic data between a diagnostic device and a control device.

DETAILED DESCRIPTION

According to various embodiments, existing inputs or outputs of the control device can be used as a diagnostic interface for the data transmission. Said inputs or outputs, generally terminations, are terminations for operator control elements and consequently, since provision is made for manual operation via said operator control elements, are also easily accessible—once the operator control elements themselves have been removed. In the case of power window lifter control devices said terminations can be in particular the connecting leads to the power window lifter switches provided as operator control elements or connectors attached thereto; the power window lifter switches are in most cases easy to disassemble and are provided with a connector. For diagnostic purposes it is then necessary merely to remove the power window lifter switches and to connect the diagnostic device to the connector(s) of the power window lifter switch, i.e. to plug it into this termination.

In order to enable immediate transmission of the (diagnostic) data, the control device can already be pre-equipped with a communication module which enables communication with the diagnostic device. The operator control element termination or terminations form control inputs via which command signals are communicated to the control device; in order then to be able to use the terminations for outputting data it is of particular advantage if the control device has an operating state switchover module responding to a predefined switchover signal of the diagnostic device. In this case it is particularly advantageous if the operating state switchover module has a detector detecting a predefined signal pattern and a switching module connected thereto. In this case it is of course conceivable to provide the detector and/or the switching module, apart from in the form of hardware or firmware, also in the form of software. By means of the predefined signal pattern the control device is prepared in the manner of a wakeup signal for a data output to the diagnostic device, and depending on the configuration of the control device or, as the case may be, of its microprocessor or microcontroller the data can then be read out directly or else via respective readout commands, for example packet by packet, and transmitted.

The input ports of control devices are mostly configured with a safety circuit which prevents excessively high voltages or frequencies being applied to the microcontroller during normal operation. Conversely, however, during the data transmission from the control device to the diagnostic device this leads to the output signal, in other words the diagnostic data signal, being relatively strongly attenuated, and also in certain conditions to the possibility that intersymbol interferences can occur. In order to compensate for the attenuation the diagnostic device can be provided on the input side with a corresponding amplifier which provides sufficient amplification. For signal equalization purposes the diagnostic device can additionally be equipped with an equalization stage assigned to the amplifier as well as with a signal equalization module based on a known algorithm, such as the Viterbi algorithm, in order thereby to reconstruct the data that is to be transmitted. Furthermore the diagnostic device can also have a clock signal recovery unit.

In order to enable operation similar to the normal operation of the control device during testing of the control device it is also of advantage if the diagnostic device has an operator control element corresponding to that of the control device, such as, say, a pushbutton or switch similar to the power window lifter switch in the case of an electric power window lifter.

Depending on the embodiment of the control device or, as the case may be, of its terminations for the operator control elements, the diagnostic device can be connected to the control device via, for example, a single-channel connection (in the case of an individual operator control element termination), for example in the form of a half-duplex connection or else preferably in the form of a full-duplex connection, or alternatively via a two-channel connection (when two operator control element terminations are present). In this case it can be favorable on the one hand if one of the channels is provided for transmitting control commands from the diagnostic device to the control device, in other words as a control line, and the other channel is provided for transmitting diagnostic data from the control device to the diagnostic device. This has the advantage that an identical embodiment for all control devices or diagnostic devices is made possible. On the other hand the control device has then to be equipped accordingly (with software, in terms of diagnostic data protocol) for this embodiment. However, it is also advantageous in many cases, for possible hardware support by the microcontroller of the control device, if one channel is provided for transmitting control commands from the diagnostic device to the control device as well as diagnostic data from the control device to the diagnostic device and the other channel is provided for clock signal transmission.

Should the control device have an easily accessible, available bus termination, the transmission of control commands can be provided via said bus termination, whereas the extensive data for analyzing the algorithm of the control device can be transmitted via the operator control element termination or terminations as a high-speed diagnostic interface.

As already mentioned, the invention is preferably applicable in the case of motor vehicles, in particular for control devices for power window lifters or else sliding/tilting sunroof drives, but also for motor-driven vehicle doors, e.g. sliding doors, tailgates or trunk lids; with control devices of this kind complex controls (control algorithms) are present, for example in regard to the specified anti-trap protection, which it is often desired to test. It is of advantage here that in the case of the switch blocks assigned to said control devices there is typically already a standard interface available which can be used for the purpose of transmitting the diagnostic data.

FIG. 1 shows a car door 1 in a schematic sectional view, wherein a per se typical control device 3 for a power window lifter (with electric motor and transmission) that is not shown in further detail is housed behind the door paneling 2. Said control device 3, which typically contains a microprocessor or microcontroller, called a CPU, hereinafter referred to generally as computing unit 4 (see FIG. 2), in order to realize in particular an anti-trap protection when the power window lifter is actuated, would therefore be accessible only with the door paneling 2 removed. The control device 3 is, however, usually accessible via operator control elements 5 on the inside of the door, said operator control elements 5 being inserted onto connectors 6 which are connected to the control device 3. Thus, once the operator control elements 5 are removed, said connectors 6 are easily accessible in order to connect a diagnostic device 7 and, via the latter, a test computer 8, e.g. a PC, to the control device 3; see the connection or, as the case may be, line 9 in FIG. 1. For clarification it should be mentioned that only one connector or termination 6 for an operator control element 5 is shown in FIG. 1—and also in FIG. 2—, though usually at least two terminations 6.1, 6.2—see for example FIG. 5—are provided for the different functions "open window" and "close window", such that then also two (or more) lines 9.1, 9.2 in accordance with a multi-channel connection are possible between the diagnostic device 7 and the control device 3. Usually also present is a ground connection (not shown in more detail in FIG. 1).

In order to set up the bidirectional connection 9 according to FIG. 1 it is therefore necessary simply to remove the operator control element 5, a pushbutton handle piece, from the termination or connector 6, whereupon the termination 6 is then immediately available for the connection to the diagnostic device 7. This situation is shown in more detail in FIG. 3, with the pushbutton 5, still depicted in full in FIG. 2, is also indicated by means of a dashed line in FIG. 3. In order to be able to control the actuation of the control device 3 during the performance of a test for diagnostic purposes in the most equivalent way possible, as in the case of the normal operation of the power window lifter, the diagnostic device 7 can also have a comparable pushbutton operator control element 5', as depicted schematically in FIG. 3, in order thereby to control the functions of the power window lifter via the control device 3 in a familiar conventional manner. It is also clear from FIG. 3, as equally from FIG. 1, on account of a double arrow 10 assigned to the connection 9, that when a test is being performed, control commands are transmitted via the connection 9 from the diagnostic device 7 to the control device 3 on the one hand and diagnostic data is transmitted from the control device 3 to the diagnostic device 7 on the other hand. In the case of the single-channel connection 9 shown, this can be brought about in the form of a half-duplex connection, with control commands and diagnostic data being transmitted in alternation; preferably, however, full-duplex operation will be provided between control device 3 and diagnostic device 7 through corresponding embodiment of the diagnostic device 7 or, on the other hand, of an additional component in the computing unit 4 of the control device 3, as will also be explained in more detail below with reference to FIG. 4, for which purpose a per se typical time-division multiplex or frequency-division multiplex method can be used for example.

FIG. 4 schematically illustrates an embodiment of the computing unit 4 for the control device 3, with a pin 11 as usual serving to accept the operator control signals effected via the operator control element 5 (FIGS. 1 and 2). In order now to be able to switch over to a diagnostic mode of operation in which data can be read out by the diagnostic device 7 from the computing unit 4 of the control device 3, an operating state switchover module 12 is implemented inside the computing unit 4. Said switchover module 12 for switching over the operating state of the computing unit 4 is normally not active, but is activated with the aid of "wakeup" signals, explained in greater detail below with reference to FIG. 6, which have a predefined signal pattern 13 or—in the case of two terminations 6.1, 6.2—13.1 and 13.2 (see FIG. 6). For detection purposes the operating state switchover module 12 has a detector module 14 which detects the predefined signal pattern 13.1 or 13.2 and if necessary activates a switching module 15 in order to initiate via the latter the switchover of an actual computing module 16 of the computing unit 4 of the control device 3. This switchover is only illustrated fairly schematically in FIG. 4 at 17 with the aid of a symbolically represented changeover switch.

In addition to a per se conventional control module 18 for driving the power window lifter (not shown) and to an anti-trap protection module 19, the actual computing module 14 has a communication module 20 which is assigned to the control module 18 and the anti-trap protection module 19 and is responsible for the data transmission desired in each case in response to control commands of the diagnostic device 7 in a per se typical manner. It should, however, be mentioned here that conventionally a communication module 20 of said kind is not present in control devices 3, but instead a corresponding control component is present in the diagnostic device 7 in order to connect directly to the computing unit 4 via a bus connection for the purpose of requesting the diagnostic data that is to be transferred.

Also visible in FIG. 4 are then two interfaces 21, 22 for the input of control or operating signals on the one hand and for the output of diagnostic data etc. on the other hand. These two interfaces 21, 22 can of course be formed in practice by means of one common interface, since in practice the switchover 17 can also be performed by means of software inside the computing module 14 or more generally the computing unit 4.

The communication module 20 in the control device computing unit 4 is thus provided in order to support communication with the diagnostic device 7; in normal operation (cf. FIG. 2), however, said communication module 20 is not active, and it is activated for the aforementioned switchover 17 by means of the special signal pattern 13.1 or 13.2 and its detection in the switchover module 12.

Beneficially, the predefined wakeup signal 13.1, 13.2 (see FIG. 6, for two terminations 6.1, 6.2), generally 13 (in the case of a single termination 6), cannot be generated by the pushbutton or the operator control element 5 for mechanical or physical reasons, and similar signal patterns of the operator control element 5 are suppressed by means of a debouncing algorithm (which typically operates on the basis of a time constant of 50 ms) usually present in the computing unit 4. After the "wakeup" or, as the case may be, switchover, the termination or at least one termination 6 of the computing unit 4 is used as an output. Typically, however, as will be explained below with reference to FIGS. 5, 9 and 10, two terminations 6.1, 6.2 are provided to the control device 3 or computing unit 4.

As soon as the communication module 20 is active, normal control of power window lifter movements is no longer possible. If such a movement is desired, this must be simulated in a different way, e.g. by means of a special diagnostic request output by the diagnostic device 7. In order to accomplish this in a convenient manner, a corresponding operator control element 5' is provided, as mentioned, on the diagnostic device 7, wherein said operator control element can also be present in the form of a "switchover operator control element" 5, cf. FIG. 5 in the case of two inputs 6.1, 6.2 to the control device 3.

FIG. 6 illustrates two exemplary impulse wakeup signals 13.1 and 13.2 which for reasons of interference resistance are offset relative to each other by a time interval of, for example, 5 ms and which are supplied to the input 6.1 or 6.2 in the case of two control device inputs (see FIG. 5) for the purpose of switching over to the manner explained in principle with reference to FIG. 4 in order thereby to be able to use both inputs 6.1, 6.2 also as outputs. In the case of a single termination, of course, only one such wakeup signal 13 is necessary.

Figure 7A:
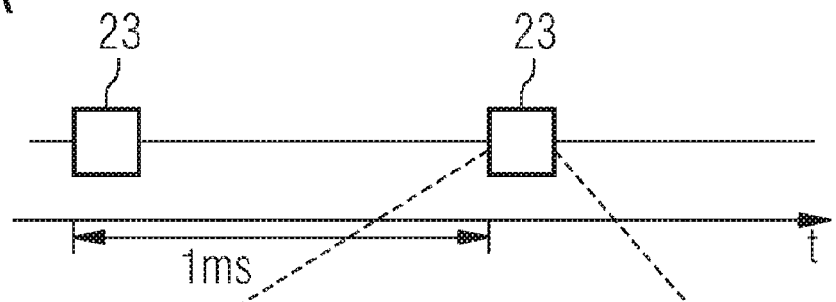
Figure 7B:
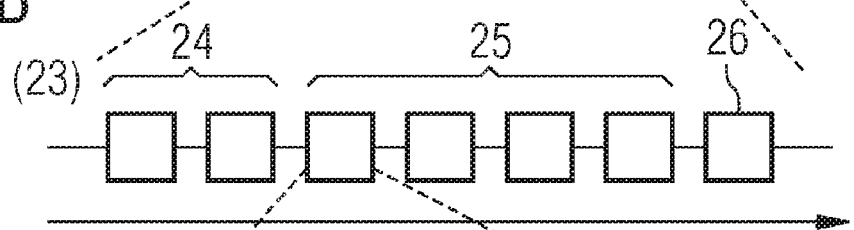

FIG. 7 shows an example of a data protocol for the transmission of data from the control device 3 to the diagnostic device 7 or, as the case may be, to the test computer 8. As shown in subfigure FIG. 7A, the data is transmitted in the form of bursts 23, at a repetition rate of 1 ms for example. According to subfigure FIG. 7B, each burst 23 has header pulses 24, data packet pulses 25 and checksum pulses 26.

Figure 7C:
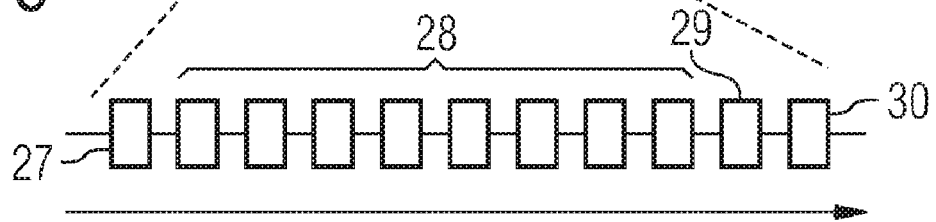

According to FIG. 7C, each data packet 25 has for its part a start bit 27, data bits 28, a parity bit 29 and a stop bit 30.

As also emerges for example from FIGS. 2 and 5, but also from FIGS. 9 and 10, the input pin 11 of the computing unit 4 in a control device 3 is typically provided with a safety circuit 31 in order to avoid damage to or destruction of the computing unit 4 in the event of an overvoltage and too high a frequency at the input 6 (or, as the case may be, 6.1, 6.2). The respective input signal is accordingly supplied via a connection point 32 between what is termed a pull-up resistor 33 and a bypass capacitor 34, and additionally provided in series for current limiting reasons is a dropping resistor 35. Similar safety circuits 31 are also provided in the case of two inputs 6.1, 6.2 for each of these inputs, as can be seen from FIGS. 5 and 9. Due to these safety circuits 31, however, a massive attenuation is produced in the case of the output of signals or, as the case may be, data from the computing unit 4 of the control device 3 to the diagnostic device 7, and furthermore intersymbol interference is also provoked due to the included capacitor 34.

In order to provide compensation here, the diagnostic device 7 according to FIG. 8 can on the one hand be equipped with a corresponding amplifier 36, as an input stage for example, said amplifier 36 simultaneously being able to perform an equalization. A channel equalizer module 38 can then be provided via an analog/digital converter 37 in order to equalize intersymbol interferences, said signal equalizer module 38 including for example a Viterbi algorithm, as known per se, in order to perform the equalization. The thus equalized signals or data are then stored in a buffer memory 39 and from there supplied to the test computer 8, (see FIG. 1). Depending on application scenario, a clock signal recovery unit 40 can furthermore also be provided in the diagnostic device 7 in order thereby to ensure that the diagnostic device 7 operates synchronously with the control device 3 during the data transmission.

A typical power window lifter switch has (at least) two switching outputs, i.e. terminations or contacts 6.1, 6.2, for the purpose of opening and closing a window, with in addition a ground connection, as can be seen in FIG. 2 for example, and furthermore often also a pin being provided for a light-emitting element in order to indicate operation of the power window lifter.

Accordingly it is advantageous to use the two switching inputs 6.1, 6.2 of the control device 3 for a bidirectional connection between the diagnostic device 7 and the control device 3, as shown in FIG. 5 in an exemplary embodiment variant in which control commands from the diagnostic device 7 to the control device 3 or, as the case may be, its computing unit 4 are transmitted via the one connection 9.1 for example, whereas the diagnostic data is transmitted from the computing unit 4 of the control device 3 to the diagnostic device 7 via the other connection 9.2, via the other termination 6.2, in the manner described.

As an alternative to this embodiment variant according to FIG. 5, FIG. 9 shows a possibility in which the control commands are transmitted from the diagnostic device 7 to the control device 3 or, as the case may be, its computing unit 4 via the one connection 9.1, via the one termination 6.1, and in addition the diagnostic data is also transmitted in the opposite direction. In this case the clock signal is transmitted via the second connection 9.2, via the second operator control element termination 6.2, in order thereby to ensure in a simple manner synchronous digital signal processing on both sides, in the computing unit 4 of the control device 3 as well as in the diagnostic device 7.

If the control device 3 possesses an—accessible—bus 41 (e.g. CAN, LIN . . . ), the diagnostic interface can be partially implemented via said bus 41; see FIG. 10. A bus driver 42 is provided in the conventional manner on the control device 3 side, and a per se likewise conventional bus converter 43 can be provided on the diagnostic device 7 side in order thereby to enable control commands to be transmitted via the bus 41 in one direction and data to be transmitted in the other direction. In this case the transmitted data can be control data, though the diagnostic data is transmitted via the high-speed diagnostic interface, via the connection 9, of the diagnostic device 7 for the purpose of analysis of the algorithm stored in the control device 3.

For the sake of completeness it should also be mentioned that the control device 3 or, as the case may be, its computing unit 4 is provided with a corresponding control output 44 to the power window lifter drive or, as the case may be, with a sensor signal input 45 for the anti-trap protection module 19, as is typical per se and as is illustrated only very schematically in FIG. 4.

What is claimed is:

1. An arrangement for transmitting data between an electronic control device comprising at least one operator control element termination and a diagnostic device,
    wherein the diagnostic device is configured for connecting to the operator control element termination,
    wherein the control device is configured for switching over from a control signal receiving status into a data transmitting operating state for outputting data via the operator control element termination, and
    wherein the control device is assigned to a motor vehicle component selected from the group consisting of:

a power window lifter, a sliding/tilting sunroof drive, a motor-driven vehicle door or sliding door, and a motor-driven tailgate or trunk lid.

2. The arrangement according to claim 1, wherein the control device has a communication module to enable communication with the diagnostic device.

3. The arrangement according to claim 1, wherein the control device has an operating state switchover module responding to a predefined switchover signal of the diagnostic device.

4. The arrangement according to claim 3, wherein the operating state switchover module has a detector detecting a predefined signal pattern and a switching module connected thereto.

5. The arrangement according to claim 1, wherein the diagnostic device has an input amplifier.

6. The arrangement according to claim 1, wherein the diagnostic device has a clock signal recovery unit.

7. The arrangement according to claim 1, wherein the diagnostic device has an operator control element corresponding to the operator control element of the control device.

8. The arrangement according to claim 1, comprising a single-channel connection between control device and diagnostic device in the form of a half-duplex or full-duplex connection.

9. The arrangement according to claim 1, comprising a two-channel connection between the control device having two operator control element terminations and the diagnostic device.

10. The arrangement according to claim 9, wherein one channel is provided for transmitting control commands from the diagnostic device to the control device and the other channel is provided for transmitting diagnostic data.

11. The arrangement according to claim 9, wherein one channel is provided for transmitting control commands from the diagnostic device to the control device as well as diagnostic data from the control device to the diagnostic device and the other channel is provided for clock signal transmission.

12. The arrangement according to claim 1, wherein in the case of an available bus termination of the control device a bus connection serving for the transmission of control commands is provided between the diagnostic device and the control device.

13. The arrangement according to claim 1, wherein the control device has an operator pushbutton or switch block as operator control element.

14. An arrangement for transmitting data between an electronic control device comprising at least one operator control element termination and a diagnostic device, wherein the diagnostic device is configured for connecting to the operator control element termination, and the control device is configured for switching over from a control signal receiving status into a data transmitting operating state for the purpose of outputting data via the operator control element termination, wherein the diagnostic device has a signal equalization module configured to provide Viterbi signal equalization.

15. A system comprising:

a diagnostic device, and a control device comprising:

at least one operator control element termination configured for communicative connection to the diagnostic device, a switchover module configured to switch from a control signal receiving status to a data transmitting operating state for communicating data to the diagnostic device via the operator control element termination, wherein the control device is assigned to a motor vehicle component selected from the group consisting of:

a power window lifter, a sliding/tilting sunroof drive, a motor-driven vehicle door or sliding door, and a motor-driven tailgate or trunk lid.

16. A control device for an arrangement according to claim 15, wherein the switchover module is configured to switch from the control signal receiving status to the data transmitting operating state in response to a predefined switchover signal received from the diagnostic device.

17. An electronic control device configured for switching between operating states, the electronic control device comprising:

a computing unit connected to an operator control element termination for applying operation signals, and a removable operator control element connected to the operator control element termination, wherein the electronic control device is configured to switch over from a control signal receiving state into a data transmitting operating state for outputting data from the computing unit via the operator control element termination to a diagnostic device, while the operator control element is removed from the operator control element termination.

\* \* \* \* \*